Feb. 8, 1966     W. T. ENGEL     3,233,719
MEANS FOR ORIENTING ARTICLES
Filed June 28, 1963     4 Sheets-Sheet 1
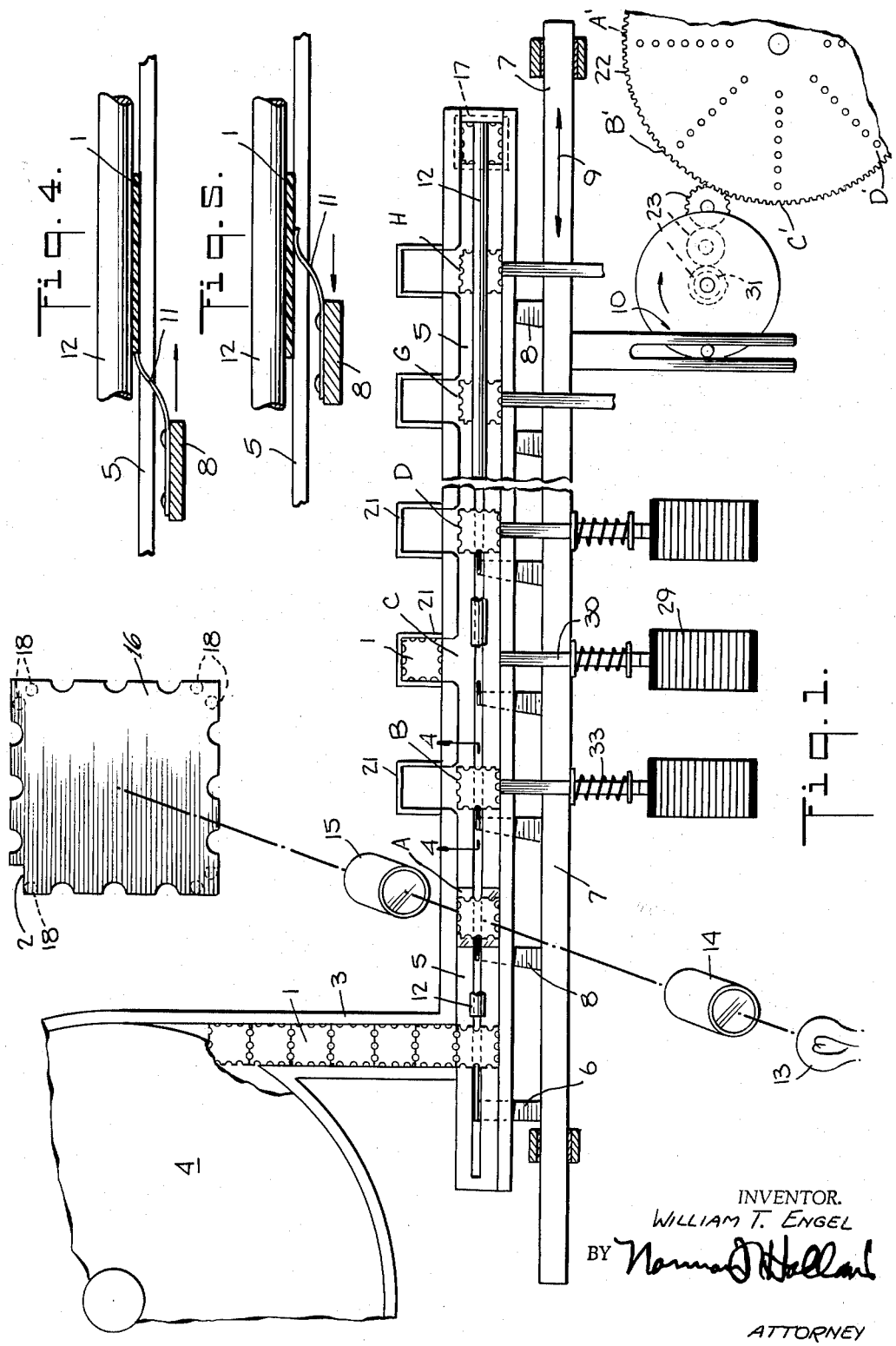
INVENTOR.
WILLIAM T. ENGEL
BY
ATTORNEY

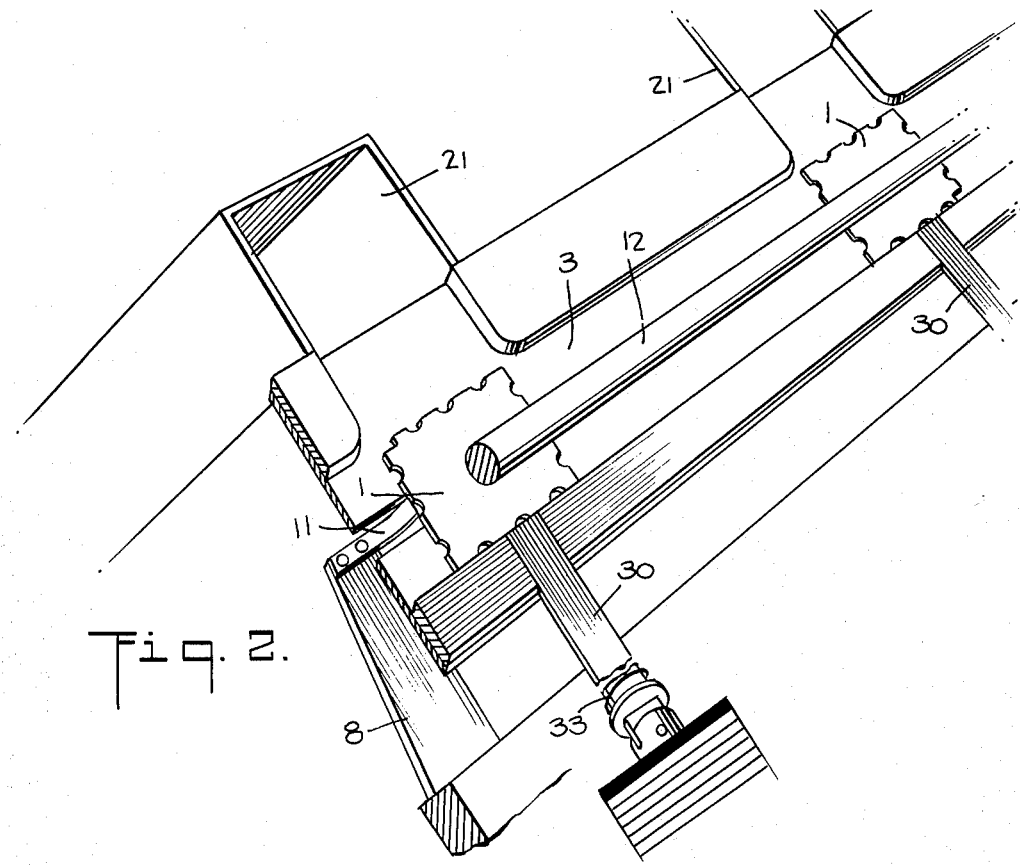
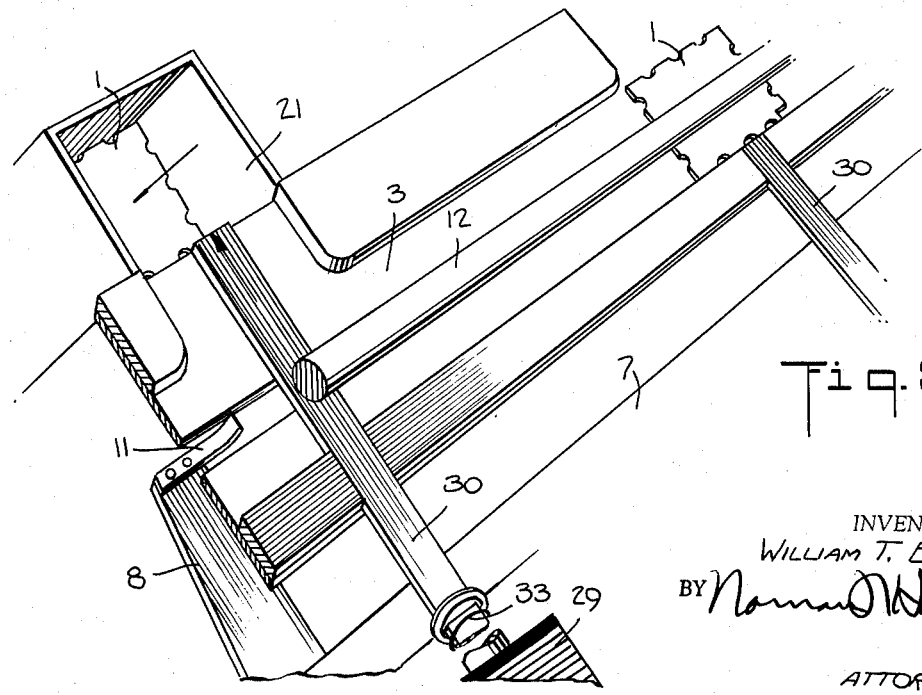

Feb. 8, 1966    W. T. ENGEL    3,233,719
MEANS FOR ORIENTING ARTICLES
Filed June 28, 1963    4 Sheets-Sheet 3
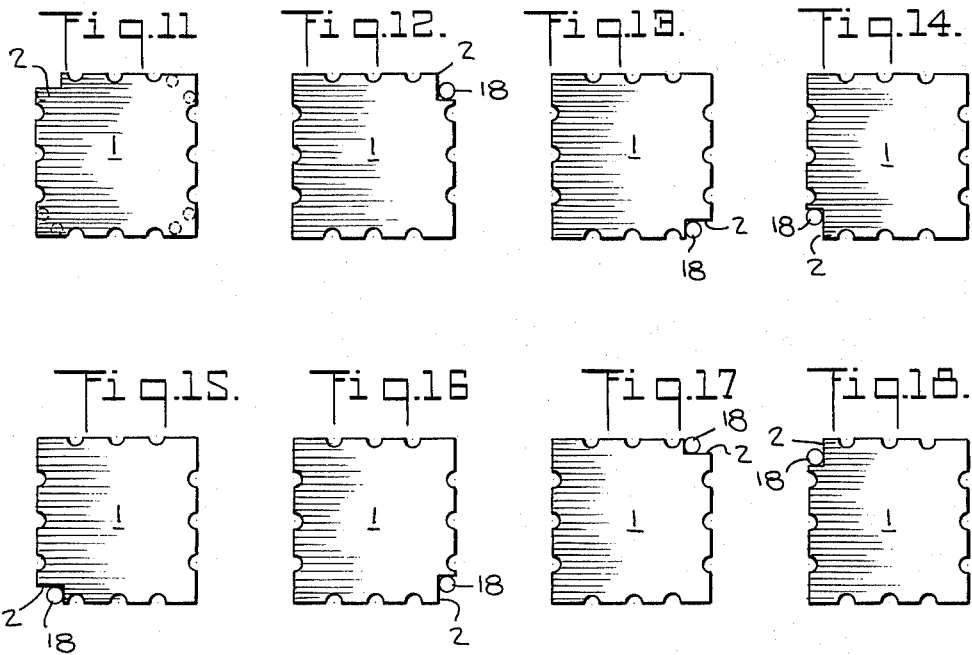
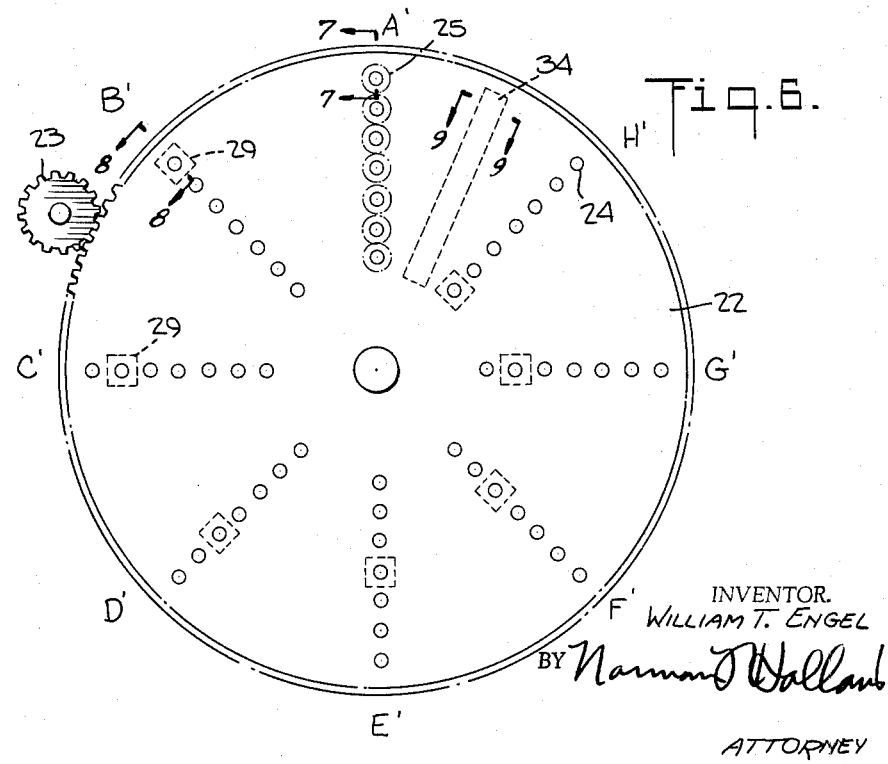
INVENTOR.
WILLIAM T. ENGEL
BY
ATTORNEY

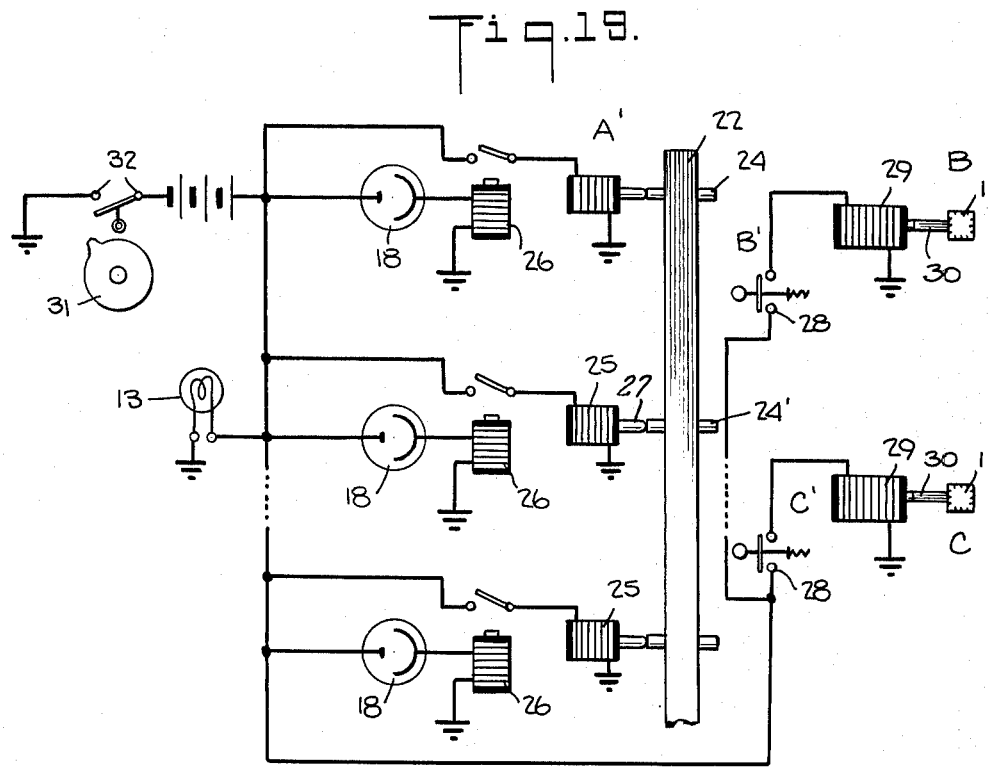
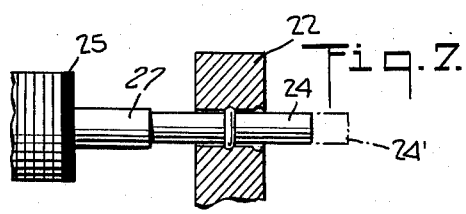
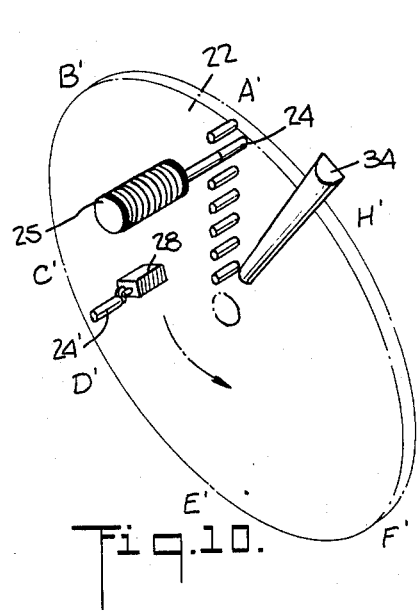
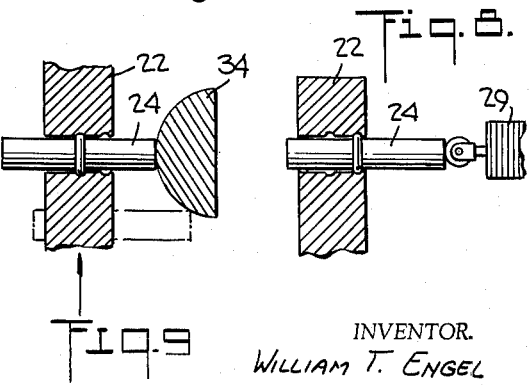

United States Patent Office 3,233,719
Patented Feb. 8, 1966

3,233,719
MEANS FOR ORIENTING ARTICLES
William T. Engel, Union, N.J., assignor to Kahle Engineering Co., Union City, N.J., a corporation of New Jersey
Filed June 28, 1963, Ser. No. 291,567
12 Claims. (Cl. 198—31)

The present invention relates to a method and means for orienting objects and more particularly to a method and means for orienting asymmetric objects using a projected image of the object.

There are numerous asymmetric objects or parts used in manufacturing assembly operations which it is desirable to store or feed using containers or magazines and where the objects must be aligned with a uniform orientation in such containers or magazines. The present invention is an improved method and means for arranging objects in magazines with a uniform orientation.

One example of such an object is a micro-module wafer having an indexing notch in one corner. Such a wafer, which will be more fully described below, may be about the shape of a postage stamp, but only one-tenth of its size, and the presence of an indexing notch in one corner gives it an asymmetric form. The present invention will be described in connection with means for orienting micro-module wafers for subsequent manufacturing operations with the indexing notch of each wafer in the same position. It is clear that the method and means disclosed can be used for orienting other asymmetric objects.

Accordingly, an object of the present invention is to provide an improved method and means of orienting asymmetric objects.

Another object of the present invention is to provide an improved photo sensitive method and means for orienting asymmetric objects.

Another object of the present invention is to provide an improved sensing method and means for an asymmetric object.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a plan view illustrating a preferred embodiment of the method and apparatus of the invention;

FIGS. 2 and 3 are enlarged detailed perspective views of micro-module selecting stations;

FIG. 4 is a sectional view of the feed track taken along line 4—4 of FIG. 1;

FIG. 5 is a sectional view corresponding to FIG. 4 with the feed in its return operation;

FIG. 6 is an enlarged top plan view of a register means;

FIGS. 7-9 are sectional views of the register means taken along lines 7—7, 8—8 and 9—9 of FIG. 6;

FIG. 10 is a detailed perspective view of the register means;

FIGS. 11-18 are plan views of micro-modules illustrating their various possible positions at the scanning station; and FIG. 19 is a schematic diagram of the register system.

The method and means of the present invention are adapted for sensing the position of an asymmetric article so that such articles when fed or supplied with random orientation are subsequently manipulated to have a uniform orientation.

The invention will be described in connection with a small wafer-like device known as a micro-module. Such modules are used in electrical devices as a mounting for additional elements or sub-circuits which may be printed or assembled thereon by known processes. The basic module is a non-conductor such as a ceramic or plastic wafer as illustrated at 1 in FIG. 11. In use, this small wafer-like object is passed through a series of automatic steps during which certain electric components such as resistors and capacitors, etc. are formed on or mounted on its surface. In order to control this automatic operation it is desirable to have each module 1 oriented in a specific position during each of the automatic operations. This is done by providing an indexing device on the wafer. This indexing device is used to provide a common orientation for all modules when the modules are fed into an automatic machine and it also permits subsequent reorientation of the modules to be sure that the circuit or element applying steps result in uniform finished modules. This indexing device may be the notch 2 formed in one corner of the module 1 as illustrated in FIG. 11. The notch 2 is made in the module 1 to provide for an initial orientation of all the modules and to provide a uniform feed of the modules into automatic processing machinery. It also provides for subsequent sensing to assure the retention of the uniform orientation throughout additional processing steps.

As illustrated in FIG. 1, the modules 1 which are to be oriented are fed into the device along an inclined feed track 3. These modules 1 are randomly oriented as regards the position of the above described indexing notch 2. The modules 1 may be fed into the feed track 3 manually or by a suitable feed hopper indicated generally at 4 which does not form part of the present invention. The modules pass down the feed track 3 under the force of gravity or under the force of a suitable feed so that the endmost module 1 enters a scanning and selecting track 5. The endmost module is moved into the track 5 by the reciprocating feed arm 6 and thereafter the modules 1 are periodically advanced to a series of scanning and selecting positions to be described below.

One embodiment of a module advancing means is illustrated in FIGS. 1, 4 and 5 comprising a reciprocably mounted bar 7 having a projecting indexing finger 8 attached thereto for each of the several scanning and selecting positions. The bar 7 oscillates in the direction of the arrow 9 (FIG. 1) under the control of a suitable drive means such as the crank device illustrated at 10. Flexible spring members 11 on the end of each of the fingers 8 engage a rear edge of each module 1 to advance it to the next station as the finger 8 moves to the right (FIG. 4). During the return motion of the finger 8 to the left (FIG. 5) the flexible spring members 11 slide over the modules permitting the return of the spring members 11 to the rear edge of the succeeding modules. It thus is seen that the continuous reciprocation of the bar 7 successively advances the modules 1 through the scanning and selecting positions for the selection operation which will now be further described. A hold down bar 12 holds the modules 1 on the track 5 during their movement.

The scanning operation is carried out at the scanning station A. At this position a conventional projector lamp 13 and lens system 14, 15 are used to form an enlarged image 16 of the module 1 at that station on a scanning plane some distance from the track 5. Such an image as illustrated at 16 for one position of a module 1 is used to generate an electrical selection signal in the following manner.

FIGS. 11–18 illustrate the eight possible positions for a module 1 at the scanning station A. One of these may be considered the correct position and a module 1 in that position need not be sensed and may pass completely through the selecting apparatus to a conveniently positioned loading magazine 17 at the end of the track 5. For each of the other seven positions, a unique electrical signal is generated which corresponds to the particular position of the module 1 and which operates a suitable module selecting means. Various means for utilizing such a unique signal may be used and a preferred embodiment of one such means will be described below.

The signal generating means comprises seven light sensitive devices 18 mounted at the scanning plane at the four corners of the projected image 16 as illustrated in FIG. 1. As clearly seen in FIG. 1, none of these photosensitive devices 18 will be activated for a module 1 in the position of the module 1 at station A FIG. 1 as the module image 16 for this position covers each of the cells 18. FIGS. 11–18 each show how a different photosensitive device 18 will be activated by the projected light means for the seven other possible positions of the modules 1. Seven different signals thus are obtained each unique to one possible position of the module 1. These signals are used for a selecting or orienting means which operates as follows.

A separate module loading magazine 21 is provided for each of seven positions which corresponds to the module positions illustrated in FIGS. 12–18. The selection signal generated at the scanning station A is used to transfer the modules 1 at the appropriate selection station into a magazine 21 and it is thus clear that all the modules in any given magazine 21 will be oriented in the same direction so that they may be thereafter consolidated in a single magazine or so that the magazines 21 may be properly positioned when loaded into a module utilizing machine.

FIG. 1 illustrates at B, C, D, G and H, five of the seven similar selecting stations at which the modules 1 are transferred to a magazine 21 in accordance with their initial orientation. As described above, an electric signal unique to each of the seven possible positions has been generated at the scanning station A to perform this selecting operation.

The means for utilizing the particular signal and for removing a module 1 at the appropriate selection station is illustrated generally in FIG. 1 and with greater particularity in FIGS. 2–10. As seen in FIG. 1, a register wheel 22 is rotatably mounted and is driven in synchronism with the module advancing bar 7 through the intermediation of a geared coupling 23 with the arm reciprocating crank 10. The register wheel 22 has eight radially directed register means each consisting of seven movable register pins 24. As the register wheel 22 rotates, the register pins 24 are turned through eight positions A′ through H′ each of which corresponds to one of the eight scanning or selecting positions on the module selector track 3. Each of the register pins 24 is movably mounted for motion between two positions as illustrated in FIGS. 7–9. When each row of pins 24 is at register station A′, the electric signal from the scanning station A is used to move one of the pins 24 to its select position in accordance with the position of the module 1 in the scanning station A. This is done by a solenoid 25, as illustrated in FIGS. 7, 10 and 19, one of which is coupled to each of the photocells 18 at the scanning station A. The solenoid 25 corresponding to the photocell 18, activated at the notched corner 2 of the module 1 closes a power relay 26 thereby causing the solenoid 25 armature 27 to strike a register pin 24 and to move it to its reject position 24′ (FIG. 7).

As the modules 1 are advanced down the selector track 3 through the selector stations B, C, D, etc. the selector pin 24 turns with the selector wheel 22 in synchronism through corresponding register stations B′, C′, D′ etc. If for example, the selector pin 24 moved to the selecting position was the selector pin 24′ arranged to select the module 1 at station C, the activated pin 24′ will arrive at station C′ when the module 1 arrives at the selection station C. At station C′, the selecting pin 24′ in its select or depressed position closes a reject switch 28 (FIGS. 8, 10 and 19) in the reject solenoid 29 circuit for station C. Solenoid 29 then operates the selecting slide 30 to move the module 1 into the storage magazine 21 at station C. The slides 30 are returned to their normal position by compressed coil springs 33. A reset cam 34 (FIGS. 9 and 10) moves all selector pins 24 to their normal undepressed position before the pins 24 return to station A′.

Appropriately positioned switches 28 are also mounted at each of the other stations B′ through H′ to similarly remove the modules 1 where their related selector pin 24 has been moved to its select position through the operation of its related pin-setting solenoid 25 at station A′.

The radially directed rows of selector pins 24 on the register wheel 23 are positioned to be engaged by the solenoids 25 and to engage the switches 28 while the modules on the track 3 are stationary i.e. while the rod 7 is returning the fingers 8 to the left (FIG. 1). This permits the scanning operation at station A and the reject operation at the selector stations to be done on stationary modules. The scanning and rejecting operations need not occur simultaneously with one another although they do in the illustrated embodiment for convenience.

A cam 31 on the selector crank 10 closes a switch 32 to momentarily energize the scanning and reject system (FIG. 19) at the proper time to align pins 24 with the solenoids 25 and the switches 28 at the various register stations A′–H′.

It thus will be seen that a novel method and means have been disclosed for identifying the position of an asymmetric object by a scanning operation and for using this information to subsequently arrange a series of such asymmetric objects with a uniform orientation. The method and means disclosed are particularly suitable for relatively small objects and an accurate scanning result is obtained through the use of an optical system which magnifies the asymmetric property of the article and which eliminates the need for reliance upon mechanical sensing means which are subject to variations due to wear and due to their inherent inertia.

The method and means are particularly useful for relatively light, thin, and fragile articles including those of very small size and for the scanning and orientation of such articles. The electro-optical nature of the device also adapts it for high speed operation to permit an economic selection of articles.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. Means for arranging randomly supplied generally rectangular and relatively small articles having orienting recesses at one of their corners comprising means for moving said articles in succession to a projecting position means for forming a complete and greatly enlarged light projected image of said articles at a plane spaced from said projecting position, a plurality of photo-electric elements positioned at the edges of the projected image at said plane, said elements being arranged for being selectively energized by the image forming light according to the positions of the recesses in the articles thereby generating electric signals indicative of the article positions, a plurality of article selecting means including storage magazines and magazine loaders, means to move the scanned articles in succession from the projecting position to the selecting means, means for storing the electric output signal from the photo-electric elements, means for synchronizing the operation of said loaders with the operation of said article moving means, and means for activating said loaders operatively coupled to said storage means.

2. The combination for distributing asymmetric articles having a position indicating means on each article comprising means for moving the articles to a scanning position, means for formng an enlarged light formed image of the articles at the scanning position, a plurality of photo-electric elements positioned near the path of the projected image, said elements being arranged for selective activation by the image forming light according to the orientation of the position indicating means on each article, said elements being adapted to generate signals indicating the positions of the articles, means for moving the articles to a selecting station, and means cooperating with said elements for distributing like-positioned articles of predetermined stacks.

3. The combination as claimed in claim 2 in which said distributing means comprises a register means for recording the generated signals.

4. The combination for distributing randomly oriented articles which are generally rectangular, relatively small and which have an orienting recess at their edges comprising means for moving and guiding the articles in succession to a scanning position, means for projecting an enlarged light formed image of said articles, a plurality of photo-electric elements positioned near the perimeter of the projected image, said elements being arranged for selective activation by the image forming light according to the position of the recess to generate electric signals indicating the orientation of each article, a circuit cooperating with said elements to receive the electric signals, said circuit including a signal storage device, means to move the scanned articles in succession from the scanning position to a distributing position, and means cooperating with said storage device for distributing said articles.

5. The combination as claimed in claim 4 in which said distributing means comprises a plurality of magazines for receiving said articles, and loading devices for said magazines coupled in circuit with said storage device.

6. The combination as claimed in claim 4 wherein a pair of said elements are positioned at each of three corners of the article image and a single element is positioned at the remaining corner.

7. The combination as claimed in claim 6 wherein each of said elements is coupled to said storage device by a signal forming circuit.

8. The combination as claimed in claim 4 wherein said storage device comprises a movable means operatively coupled to said article moving means for movement in synchronizm therewith, and a plurality of register elements movably mounted on said movable means.

9. The combination for distributing relatively small asymmetric articles having recessed edge portion comprising means for moving and guiding the articles to a scanning position, means for forming an enlarged light formed image of the articles at the scanning position, a plurality of photo-electric elements positioned near the perimeter of the image, said elements being arranged for selective activation by the image forming light according to the position of the recessed edge portion, and said elements generating signals indicating the positions of the articles, means for moving the articles to a selecting station, and means cooperating with said elements for distributing like-positioned articles to predetermined stacks.

10. An apparatus for selecting small asymmetric articles having a recess at its edge comprising the combination of a guide, means for moving a series of randomly oriented objects along the guide to a scanning station, light means for projecting an enlarged image of the articles at the scanning station, a plurality of photo-electric elements positioned near the perimeter of the image formed by said light projecting means, said recess cooperating with said light means to activate a photo-electric element located at the recess portion of the projected image, a circuit cooperating with the photo-electric elements to produce signals according to the orientation of the articles, a memory wheel cooperating with said circuit for indicating a station at which the objects are to be removed from said apparatus, means for moving said objects to a removal station, said last named means moving in timed relation with the memory wheel, and ejector arms cooperating with the memory wheel to remove the articles from said apparatus at predetermined stations.

11. An apparatus for selecting small asymmetric articles having a position indicating recess, comprising the combination of means for moving and guiding a series of randomly oriented articles to a scanning station, light means for projecting an enlarged image of each article at the scanning station, a plurality of photo-electric elements positioned within the perimeter of the image formed by said light projecting means whereby one of the photo-electric lamps is exposed by the recess and activated by the light means, a circuit cooperating with the exposed photo-electric element to produce a signal according to the orientation of the projected article, a memory wheel cooperating with said circuit for indicating a station at which each article is to be removed from said apparatus, means for moving said articles to the removal station, said means moving in timed relation with the memory wheel, and ejector arms cooperating with the memory wheel to remove each article from said apparatus at a predetermined removal station.

12. An apparatus for selecting small asymmetric articles with each article having a recess at its perimeter comprising the combination of an elongated guide, a plurality of reciprocating fingers for moving a series of randomly oriented objects along the guide to a scanning station and then to removal stations, light means for projecting an enlarged image of the articles at the scanning station, a plurality of photo-electric elements positioned within the perimeter of the image formed by said light projecting means whereby one of the photo-electric lamps is exposed by the recess and activated by the light means, a circuit cooperating with the photo-electric elements to produce signals according to the photo-electric element activated, a memory wheel cooperating with said circuit for indicating a station at which the objects are to be removed from said apparatus, said memory wheel moving in timed relation with the reciprocating fingers, said circuit further including solenoid actuated ejector arms each having an activating switch, and said memory wheel cooperating with the switches to activate an ejector arm for removing articles from the guide means to predetermined stacks according to the orientation of each article.

References Cited by the Examiner

UNITED STATES PATENTS

| | | | |
|---|---|---|---|
| 1,868,894 | 7/1932 | Glahn | 214—11 |
| 2,369,794 | 2/1945 | Phinney | 209—111.7 |
| 2,558,577 | 6/1951 | Myers | 209—111.7 |
| 2,618,386 | 11/1952 | Samain | 209—111.7 |
| 2,666,536 | 1/1954 | Smith | 214—11 |
| 2,914,161 | 11/1959 | Black | 198—33.1 |
| 2,971,660 | 2/1961 | Lash | 214—11 |
| 3,022,891 | 2/1962 | Efram | 209—111.7 |
| 3,086,636 | 4/1963 | Raynor | 214—11 X |
| 3,153,978 | 10/1964 | Zeutschel | 209—111 |

GERALD M. FORLENZA, *Primary Examiner.*

MORRIS TEMIN, HUGO O. SCHULZ, *Examiners.*